United States Patent
Hoff

(10) Patent No.: US 9,122,503 B1
(45) Date of Patent: Sep. 1, 2015

(54) SYSTEMS AND METHODS FOR ADAPTIVE THROTTLING OF INPUT/OUTPUT REQUESTS IN A VIRTUAL ENVIRONMENT

(71) Applicant: Symantec Corporation, Mountain View, CA (US)

(72) Inventor: Torsten Hoff, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 70 days.

(21) Appl. No.: 14/018,760

(22) Filed: Sep. 5, 2013

(51) Int. Cl.
*G06F 11/00* (2006.01)
*G06F 9/455* (2006.01)
*G06F 21/56* (2013.01)

(52) U.S. Cl.
CPC ............ *G06F 9/45533* (2013.01); *G06F 21/56* (2013.01)

(58) Field of Classification Search
CPC ............ H04L 63/1416; H04L 63/1408; H04L 63/1441; H04L 63/1458; G06F 21/552
USPC .......................................... 726/22–25; 718/1
See application file for complete search history.

(56) References Cited

U.S. PATENT DOCUMENTS

2012/0011499 A1* 1/2012 Conover et al. .................... 718/1
2013/0132057 A1* 5/2013 Deng et al. ....................... 703/21

OTHER PUBLICATIONS

"Allocating system resources to a virtual machine", https://technet.microsoft.com/en-us/library/cc720354(v=Ws.10).aspx, as accessed Jul. 24, 2013, Microsoft TechNet, (Mar. 8, 2011).

"Configuring CPU resources for virtual machines", https://technet.microsoft.com/en-us/library/cc720296(v=ws.10).aspx, as accessed Jul. 24, 2013, Microsoft TechNet, (Mar. 19, 2011).
"Disk write latency", https://communities.vmware.com/thread/263115?start=0, as accessed Jul. 24, 2013, VMware Community, (Feb. 27, 2008).
"McAfee VirusScan Enterprise", http://www.mcafee.com/us/products/virusscanenterprise.aspx, as accessed Jul. 24, 2013, McAfee, Inc., (Dec. 17, 2010).
"OfficeScan—Endpoint Protection", http://www.trendmicro.com/us/enterprise/product-security/officescan/, as accessed Jul. 24, 2013, Trend Micro Incorporated, (On or before Jul. 24, 2013).
"Kaspersky Endpoint Secutiry for Business", http://www.kaspersky.com/business-security/endpoint-select, as accessed Jul. 24, 2013, Kaspersky Lab, (Feb. 3, 2013).
"System Center 2012 R2", http://www.microsoft.com/en-us/servercloud/products/system-center-2012-r2/, as accessed Jul. 24, 2013, Microsoft.
"Endpoint Protection", https://www.sophos.com/en-us/products/endpointantivirus.aspx, as accessed Jul. 24, 2013, Sophos Ltd., (On or before Jul. 24, 2013).

* cited by examiner

*Primary Examiner* — Baotran N To
(74) *Attorney, Agent, or Firm* — ALG Intellectual Property, LLC

(57) ABSTRACT

A computer-implemented method for adaptive throttling of input/output requests in a virtual environment may include (1) monitoring input/output requests sent from a virtual machine to a storage system, (2) determining a latency of one or more of the monitored input/output requests, (3) determining that the latency exceeds a threshold, and (4) reducing, in response to determining that the latency exceeds the threshold, a rate at which an application on the virtual machine sends input/output requests to the storage system. Various other methods, systems, and computer-readable media are also disclosed.

20 Claims, 6 Drawing Sheets

SYSTEMS AND METHODS FOR ADAPTIVE THROTTLING OF INPUT/OUTPUT REQUESTS IN A VIRTUAL ENVIRONMENT

BACKGROUND

A single computing system may host multiple virtual machines. Virtual machines may run independently (i.e., without knowing about other virtual machines on the system) and, when contending for resources, may overload their system with resource requests. For example, when virtual machines initiate security scans at the same time (known as an AV storm), the workload generated on the underlying system may be substantial, potentially causing delays in critical applications and processes. Other events, such as database backups, may cause similar problems. Resource contention management systems may attempt to mitigate performance loss in a variety of ways, but some may not work effectively (as can be the case with AV storms), and others may involve tedious and resource-intensive coordination. For example, to prevent hardware overload in an AV storm, each virtual machine may have to communicate with every other virtual machine about when to run security scans, or a user may have to configure each virtual machine manually. The former can incur performance overhead, and the latter may consume a significant amount of an administrator's time.

What is needed, therefore, is a more efficient and effective mechanism for managing resources shared among virtual machines.

SUMMARY

As will be described in greater detail below, the instant disclosure generally relates to systems and methods for adaptive throttling of input/output requests in a virtual environment. For example, a method for adaptive throttling of input/output requests in a virtual environment may include (1) monitoring input/output requests sent from a virtual machine to a storage system, (2) determining a latency of one or more of the monitored input/output requests, (3) determining that the latency exceeds a threshold, and (4) reducing, in response to determining that the latency exceeds the threshold, a rate at which an application on the virtual machine sends input/output requests to the storage system.

In one embodiment, the application may include an anti-malware application that is performing a security scan that causes the latency to exceed the threshold. In some examples, reducing the rate at which the application on the virtual machine sends input/output requests may include pausing the security scan.

In some examples, the computer-implemented method may further include performing the following steps after pausing the security scan: (1) monitoring additional input/output requests sent from the virtual machine to the storage system, (2) determining a subsequent latency of one or more of the additional monitored input/output requests, (3) determining that the subsequent latency has fallen below an additional threshold, and (4) resuming the security scan in response to determining that the subsequent latency has fallen below the additional threshold.

In some examples, determining that the latency exceeds the threshold may include determining that the latency of one or more read operations exceeds the threshold. In another embodiment, the virtual machine may include one of a plurality of virtual machines that are simultaneously accessing the storage system.

According to various embodiments, the application performs at least one of monitoring the input/output requests, determining the latency, determining that the latency exceeds the threshold, or reducing the rate.

In one embodiment, a system for implementing the above-described method may include (1) a monitoring module that monitors input/output requests sent from a virtual machine to a storage system, (2) a latency module that determines a latency of one or more of the monitored input/output requests, (3) a determination module that determines that the latency exceeds a threshold, (4) a throttling module that reduces, in response to determining that the latency exceeds the threshold, a rate at which an application on the virtual machine sends input/output requests to the storage system, and (5) at least one processor configured to execute the monitoring module, the latency module, the determination module, and the throttling module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) monitor input/output requests sent from a virtual machine to a storage system, (2) determine a latency of one or more of the monitored input/output requests, (3) determine that the latency exceeds a threshold, and (4) reduce, in response to determining that the latency exceeds the threshold, a rate at which an application on the virtual machine sends input/output requests to the storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
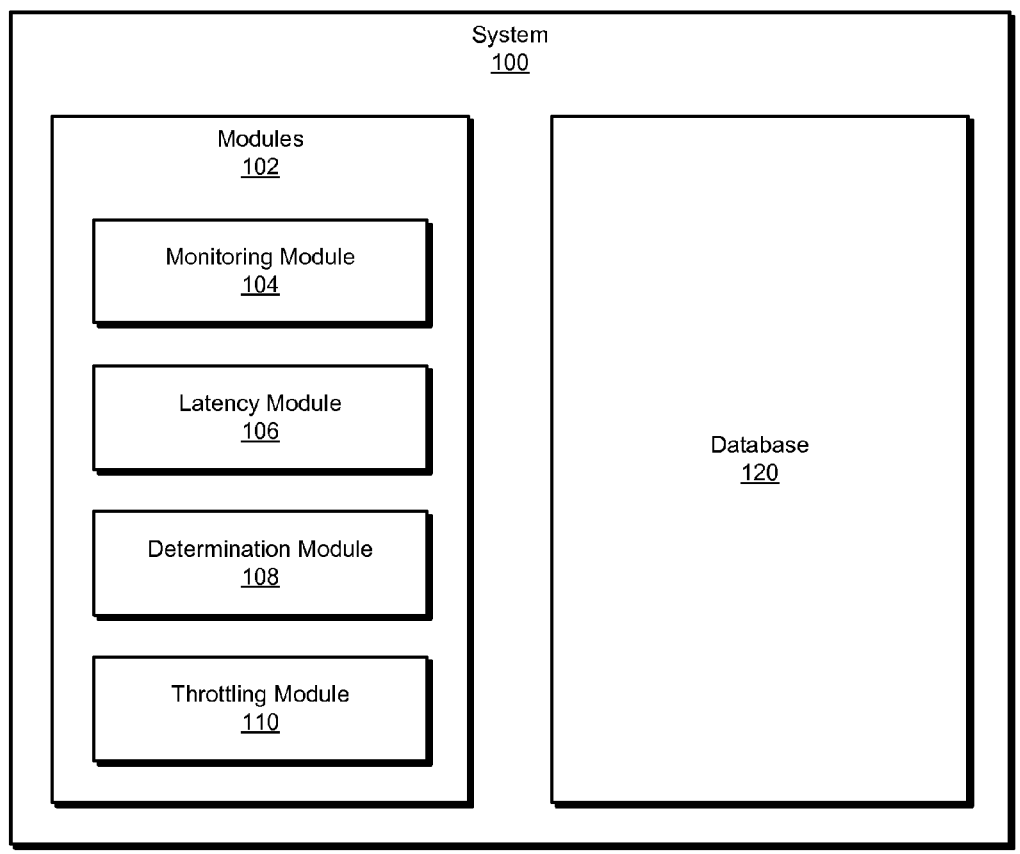
FIG. 1 is a block diagram of an exemplary system for adaptive throttling of input/output requests in a virtual environment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for adaptive throttling of input/output requests in a virtual environment. The systems and methods described herein may monitor input/output requests sent from a virtual machine to a storage system, determine the latency of these input/output requests, determine that the latency exceeds a certain threshold, and reduce the rate at which an application running on the virtual machine sends input/output requests to the storage system.

As will be explained in greater detail below, systems and methods described herein may improve input/output performance in virtualized environments regardless of the virtualization technology being implemented. The systems and methods of the present disclosure may also improve performance without coordinating task timing among multiple virtual machines. Embodiments of the instant disclosure may also provide various other features and advantages.

Figure 2:
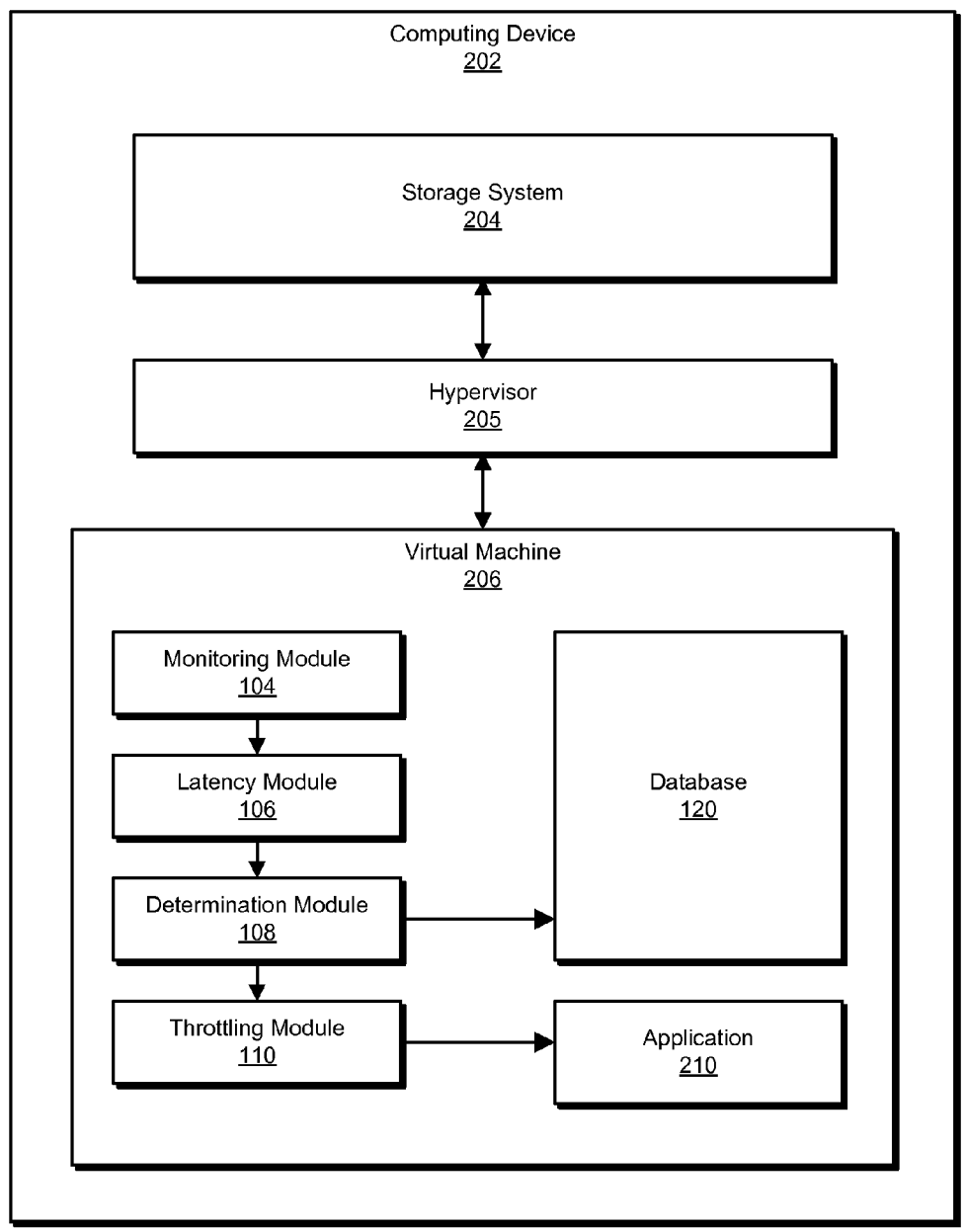
FIG. 2 is a block diagram of the exemplary system shown in FIG. 1 implemented in a virtual machine.
Figure 3:
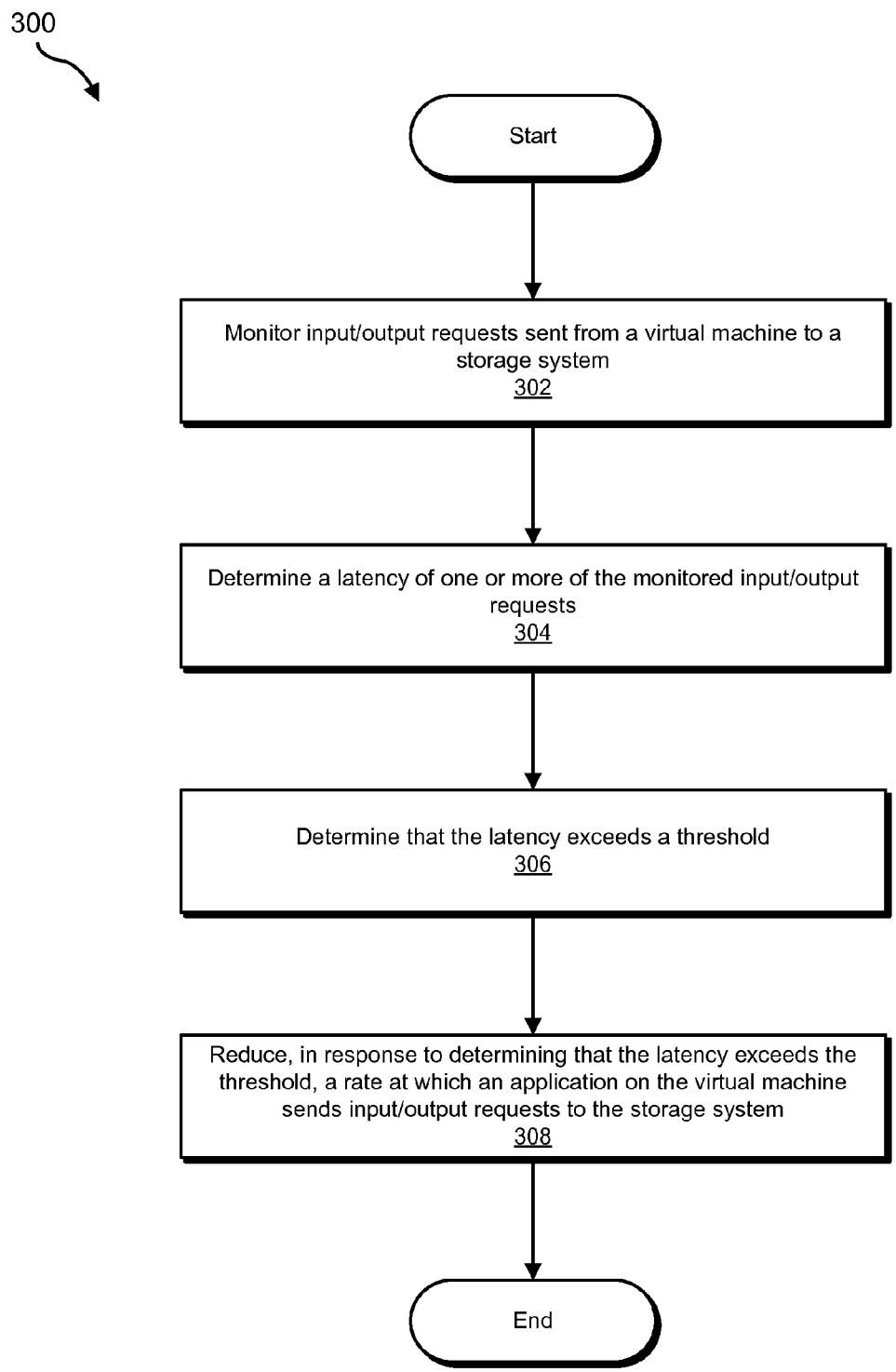
FIG. 3 is a flow diagram of an exemplary method for adaptive throttling of input/output requests in a virtual environment.
Figure 4:
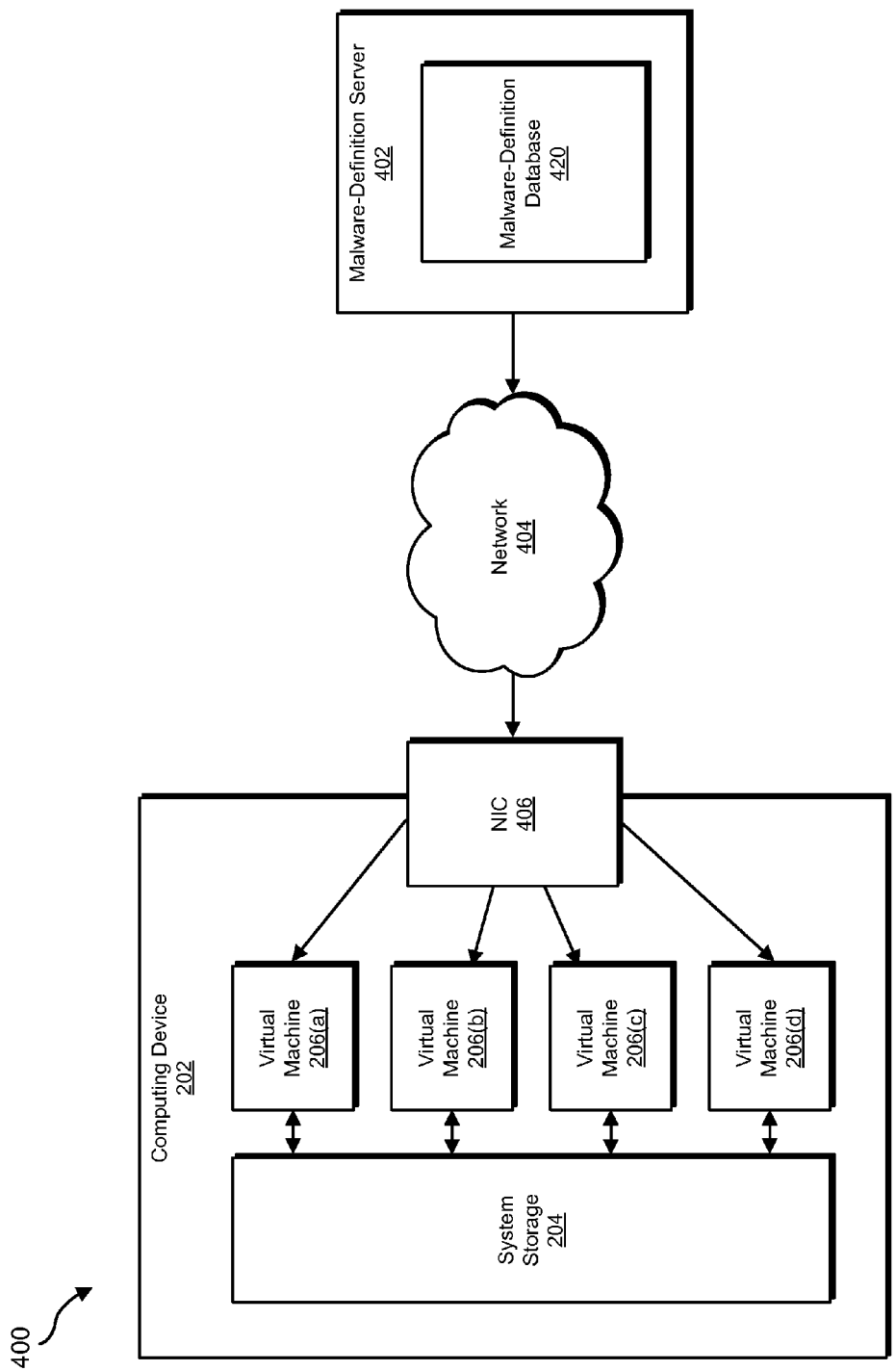
FIG. 4 is a block diagram of an exemplary system for adaptive throttling of input/output requests in a virtual environment with multiple virtual machines.

The following will provide, with reference to FIGS. 1, 2, and 4, detailed descriptions of exemplary systems for adaptive throttling of input/output requests in a virtual environment. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for adaptive throttling of input/output requests in a virtual environment. As illustrated in this figure, exemplary system 100 may include one or more modules 102 for performing one or more tasks. For example, and as will be explained in greater detail below, exemplary system 100 may include a monitoring module 104 that may monitor input/output requests sent from a virtual machine to a storage system. Exemplary system 100 may additionally include a latency module 106 that may determine a latency of one or more of the monitored input/output requests. System 100 may also include a determination module 108 that determines that the latency exceeds a threshold. System 100 may further include a threshold module 110 that may reduce, in response to the determination that the latency exceeds the threshold, a rate at which an application on the virtual machine sends input/output requests to the storage system.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, and/or virtual machine 206), computing system 510 in FIG. 5, and/or portions of exemplary network architecture 600 in FIG. 6. One or more of modules 102 in FIG. 1 may also represent all or portions of one or more special-purpose computers configured to perform one or more tasks. Although illustrated as separate elements, one or more of modules 102 in FIG. 1 may represent portions of a single module or application.

As illustrated in FIG. 1, exemplary system 100 may also include one or more databases, such as database 120. In one example, database 120 may be configured to store the latency of one or more input/output requests sent by the virtual machine to the storage system. The database may also be configured to store one or more latency thresholds. The database may also be configured to store information about rates and/or volumes of input/output requests sent from a virtual machine to a storage system.

Database 120 may represent portions of a single database or computing device or a plurality of databases or computing devices. For example, database 120 may represent a portion of virtual machine 206 in FIG. 2, subsystem-computing device 202, computing system 510 in FIG. 5, and/or portions of exemplary network architecture 600 in FIG. 6. Alternatively, database 120 in FIG. 1 may represent one or more physically separate devices capable of being accessed by a computing device, such as virtual machine 206 in FIG. 2, subsystem-computing device 202, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. Computing device 202 may be programmed with one or more of modules 102 and/or may store all or a portion of the data in database 120. Additionally or alternatively, virtual machine 206 may be programmed with one or more of modules 102 and/or may store all or a portion of the data in database 120.

In one embodiment, one or more of modules 102 from FIG. 1 may, when executed by at least one processor of computing device 202 and/or virtual machine 206, enable computing device 202 and/or virtual machine 206 to adaptively throttle input/output requests from virtual machine 206. For example, and as will be described in greater detail below, monitoring module 104 may be programmed to monitor input/output requests sent from virtual machine 206 to storage system 204. Latency module 106 may be programmed to determine a latency of one or more of the monitored input/output requests. Determination module 108 may be programmed to determine that the latency exceeds a threshold (e.g., by querying database 120 for a threshold and comparing the latency against the threshold). Throttling module 110 may be programmed to reduce, in response to determining that the latency exceeds the threshold, a rate at which an application 210 on virtual machine 206 sends input/output requests to storage system 204.

As shown in FIG. 2, a hypervisor 205 may manage virtual machine 206 and may abstract hardware of computing device 202, such as storage system 204, from virtual machine 206. Hypervisor 205 generally represents any type or form of software, firmware, and/or hardware that may create, run, and/or manage one or more virtual machines.

Computing device 202 generally represents any type or form of computing device capable of reading computer-executable instructions and hosting one or more virtual machines. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Storage system 204 generally represents any type or form of storage device or medium capable of storing data and/or other computer-readable instructions. Examples of storage system 204 include, without limitation, a hard drive, an external hard drive, a solid-state drive, a USB flash drive, a floppy disk, any type of storage device that can be used as primary storage device 532 in FIG. 5, or any other suitable storage device.

Virtual machine 206 generally represents any type or form of virtual computing device that is capable of reading computer-executable instructions. Examples of virtual machine 206 include, without limitation, any type or form of software-based and/or emulated computing platforms.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

FIG. 3 is a flow diagram of an exemplary computer-implemented method 300 for adaptive throttling of input/output requests in a virtual environment. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may monitor input/output requests sent from a virtual machine to a storage system. For example, at step 302 monitoring module 104 may, as part of virtual machine 206 on computing device 202 in FIG. 2, monitor input/output requests sent from virtual machine 206 to storage system 204.

As used herein, the phrase "input/output requests" generally refers to any type or form of input (e.g., read) and/or output (e.g., write) requests sent from an application to a processor. The phrase "input/output requests" may refer to requests to read or write to any type or form of application file, database file, registry file, document file, etc., or any other kind of file or electronic data unit stored in a storage system or storage medium. For example, an application may request to open files from a hard drive or save files to the hard drive. The phrase "input/output requests" may also refer to requests to read or write to files stored on hard disk drives, RAID arrays, solid state drives, or on volatile storage mediums such as Random Access Memory (RAM) modules. For example, input/output requests may include requests to scan executable files stored on a hard drive or held in RAM. In one embodiment, the phrase "input/output requests" may refer to requests to scan, read, examine, search, or analyze the contents, code, metadata, or any other information in or about a file. For example, input/output requests may include requests from an anti-malware application to scan the contents of files that are stored on a hard drive or held in RAM.

The phrase "virtual machine," as used herein, generally refers to any type or form of software implementation of a computing system that can execute programs in a manner similar to a physical machine. For example, the phrase "virtual machine" may refer to a software-implemented computing platform capable of emulating any type or form of physical hardware. A virtual machine may include any operating system environment that is abstracted from computing hardware by a virtual machine manager (e.g., a hypervisor, such as hypervisor 205). A hypervisor (e.g., VMWARE) may be configured to manage one or more virtual machines (e.g., virtual machine 206) on a computing system (e.g., computing device 202).

Monitoring module 104 may monitor input/output requests sent from virtual machine 206 to storage system 204 in a variety of ways. For example, monitoring module 104 may be part of application 210 on virtual machine 206, an application plug-in that is part of application 210, a standalone application or process on virtual machine 206, or any other suitable code running within virtual machine 206 or hypervisor 205. For example, monitoring module 104 may, as part of application 210 on virtual machine 206, monitor input/output requests sent from application 210 to storage system 204. In some embodiments, monitoring module 104 may monitor input/output requests by utilizing a resource monitoring tool or by monitoring an Application Programming Interface (API) that handles input/output requests.

At step 304 one or more of the systems described herein may determine a latency of one or more of the monitored input/output requests. For example, at step 304 latency module 106 may, as part of virtual machine 206 on computing device 202, determine a latency of one or more of the monitored input/output requests.

As used herein, the term "latency" generally refers to a measurement of time (often measured in short increments, such as milliseconds) indicative of the time required to execute and/or complete an input/output request (i.e., the time that an input/output request must wait in a queue before it is executed). A latency measurement may include the it time takes virtual machine 206 to process an input/output request, the time involved in transmitting the input/output request to storage system 204, the time it takes storage system 204 to handle the input/output request, the time involved in transmitting a response to the request from storage system 204 to virtual machine 206, the time it takes virtual machine 206 to handle the response to the input/output request, and/or any other delays involved in handling a request. Latency may include time delays involved in waiting for a storage system (e.g., storage system 204) to handle requests that are prioritized ahead of a request being measured.

As an example of a latency measurement, the "latency" of a read instruction may include the time it takes a processor to execute the read request, the time it takes to process a write request that is prioritized ahead of the read request, as well as the time it takes for a hard drive of storage system 204 to position the proper sector under a read/write head in order to read the requested data from storage system 204.

Latency module 106 may determine a latency of one or more of the monitored input/output requests in a variety of ways. For example, latency module 106 may determine latency of a read or write request by detecting or measuring the amount of time it takes to receive a response to a read or write request. Measuring the amount of time it takes to receive a response to a request may involve detecting a time when a request is issued, detecting a time when a response to the request is received, and calculating the difference between the two times. Latency module 106 may additionally or alternatively calculate latency using any other suitable algorithm.

Latency module 106 may access and/or use a variety of tools in determining latencies. For example, latency module 106 may detect read and/or write latencies by accessing a resource monitoring tool or API (e.g., MICROSOFT'S PERFORMANCE DATA HELPER) that measures the performance of software and/or hardware on computing device 202.

Latency module 106 may also determine latencies by using any other tool or API that is capable of measuring or providing information about delays on a computing device.

In at least one embodiment, a hypervisor may include latency measurement tools that are available to latency module 106. Latency module 106 may leverage latency information collected by hypervisor 205 in the virtual environment (e.g., the time it takes a virtual application to process a read/write to a virtual storage medium) or on the physical system (e.g., the time it takes to read/write to a physical hard drive), as well as any other latency or combination of latencies.

At step 306 one or more of the systems described herein may determine that the latency of one or more of the input/output requests (determined at step 304) exceeds a threshold. For example, at step 306, determination module 108 may, as part of virtual machine 206 on computing device 202 in FIG. 2, determine that the latency of one or more of the input/output requests (determined at step 304) exceeds a threshold from database 120.

The term "threshold," as used herein, may refer to any type of value used in comparison to another value to determine if one value matches, exceeds, or falls below the other value. For example, the term "threshold" may refer to a time value measured in milliseconds (e.g., 5 milliseconds, 10 milliseconds, etc.) that is stored in database 120. The term "threshold" may refer to any other type or form of value stored in database 120 that may be used to determine if the latency determined at step 304 is longer than a particular length of time.

Determination module 108 may perform step 306 in FIG. 3 in a variety of ways. For example, determination module 108 may compare the latency to a threshold value stored in database 120. Upon comparison, determination module 108 may determine that the value of the latency exceeds (i.e., is greater than) the threshold value stored in database 120. In some examples, determination module 108 may determine that the latency of one or more read operations exceeds the threshold. For example, determination module 108 may determine that the latency of read operations sent by an anti-malware application performing a security scan exceeds the threshold value stored in database 120.

At step 308 one or more of the systems described herein may reduce, in response to determining that the latency exceeds the threshold, a rate at which an application on the virtual machine sends input/output requests to the storage system. For example, at step 308 throttling module 110 may, as part of virtual machine 206 on computing device 202 in FIG. 2, reduce, in response to determining that the latency exceeds the threshold, a rate at which application 210 on virtual machine 206 sends input/output requests to storage system 204. In some embodiments, throttling module 110 may be part of the application that is sending input/output requests to storage system 204 (e.g., application 210). For example, throttling module 110 may be a software module in an anti-malware application responsible for reducing the speed at which the anti-malware application sends input/output requests to storage system 204. Alternatively, throttling module 110 may be a module that is separate from the application sending input/output requests to storage system 204, such as a module that is part of the hypervisor or part of a different application on virtual machine 206.

The application referred to in step 308 may be any application capable of sending input/output requests to a computing device, such as computing device 202. For example, the application referred to in step 308 may be an anti-malware application, a database-backup application, a file-transfer application, etc. In embodiments where the application is an anti-malware application that is performing a security scan (e.g., a virus scan), throttling module 110 may pause the security scan. Alternatively, throttling module 110 may slow the security scan by reducing the rate at which the security scan sends read/write requests to storage system 204.

In some embodiments, after pausing or slowing the security scan, monitoring module 104 may monitor additional input/output requests sent from virtual machine 206 to storage system 204, and latency module 106 may determine a subsequent latency of one or more of the additional monitored input/output requests. Determination module 108 may determine that the subsequent latency has fallen below an additional threshold. In some examples, the additional threshold may include a threshold value stored in database 120. Determination module 108 may compare that value to the subsequent latency of input/output requests to determine if the subsequent latency has fallen below the threshold value. Additionally, throttling module 110 may resume or speed up the security scan in response to determining that the subsequent latency has fallen below the additional threshold. In some embodiments, the additional threshold value may be the same as the threshold value that triggered throttling input/output requests of the application. Alternatively, the additional threshold value may be different from the threshold value that triggered the throttling.

FIG. 4 is an exemplary block diagram of a virtual environment where computing device 202 is configured to host multiple virtual machines 206(a)-(d). In some embodiments, virtual machines 206(a)-(d) may be instances of virtual machines similar to virtual machine 206 in FIG. 2 or any other virtual machines that can be hosted concurrently. In other embodiments, virtual machines 206(a)-(d) may be configured to share resources across multiple computing devices in any suitable configuration. For example, virtual machines 206(a)-(d) may be hosted in a virtual environment configured across multiple servers and may share hardware resources on those servers.

In at least one embodiment, virtual machines 206(a)-(d) may be configured to send input/output requests to system storage 204. Because they share resources and storage systems on computing device 202, virtual machines 206(a)-(d) may, in some scenarios, compete for access to storage system 204. For example, virtual machine 206(a) may be running a security scan that sends a high volume of read requests to storage system 204. This may slow or degrade the performance of virtual machines 206(b)-(d) and delay their access to storage system 204. Embodiments of the instant disclosure may address this issue by throttling the security scan on one or more of virtual machines 206(a)-(d) until the latency of input/output requests decreases, thus improving the overall performance of virtual machines 206(a)-(d). In this embodiment, there may be no need for any communication or coordination between each virtual machine, as modules 102 may be configured to run in standalone virtual environments (i.e., each of virtual machines 206(a)-(d) may execute independent instances of modules 102) and can therefore independently improve the performance of computing device 202.

FIG. 4 also includes a malware-definition server 402 that is configured to send malware-definition updates (contained in malware-definition database 420) to anti-malware applications on virtual machines 206(a)-(d) via Network Interface Card (NIC) 406. In some scenarios, virtual machines 206(a)-(d) may each be running instances of an anti-malware application and receive, at the same time, malware-definition updates from malware-definition server 402, and that update may activate automatic security scans (a scenario known as an "AV storm"). In an AV storm, the performance hit to an underlying computing subsystem (such as computing device 202) can be severe. To overcome this problem, some solutions may involve manually configuring each virtual machine to run security scans at different intervals. Additionally or alternatively, some solutions may involve configuring virtual machines 206(a)-(d) to communicate with each other.

To address the inefficiencies associated with inter-virtual machine coordination and manual configuration, virtual machines 206(a)-(d) may be configured with modules 102 that implement the systems and methods described herein. For example, in scenarios where virtual machines 206(a)-(d) are configured with modules 102, during an AV storm, an instance of monitoring module 104 on each machine may monitor the read/write requests that are sent from virtual machines 206(a)-(d) to storage device 204. A latency module 106 on each virtual machine may detect that the latency of read/write requests has increased (because of the AV storm). A determination module 108 on each virtual machine may determine that these increased latencies have exceeded their latency thresholds. A throttling module 110 on each machine may then, based on that determination, slow down or pause the security scans until the latency decreases.

In the above embodiment, each virtual machine may be able to throttle security scans independent of each other and adapt to a variety of situations. For example, if virtual machine 206(a) completes a security scan, virtual machine 206(b) may detect that the latency of input/output requests has decreased, and may then resume its security scan. However, if virtual machine 206(c) and virtual machine 206(d) are still running security scans, virtual machine 206(b) may wait to resume its security scan until the others have completed theirs by waiting until the latency of input/output requests has fallen below a desired threshold. In some examples, even one virtual machine configured with modules 112 may dramatically improve the performance of computing device 202 during an AV storm. These and the other examples above are meant to illustrate, in a non-limiting way, the flexibility that adaptive throttling of input/output requests (based on input/output latency) may provide for virtual environments.

Figure 5:
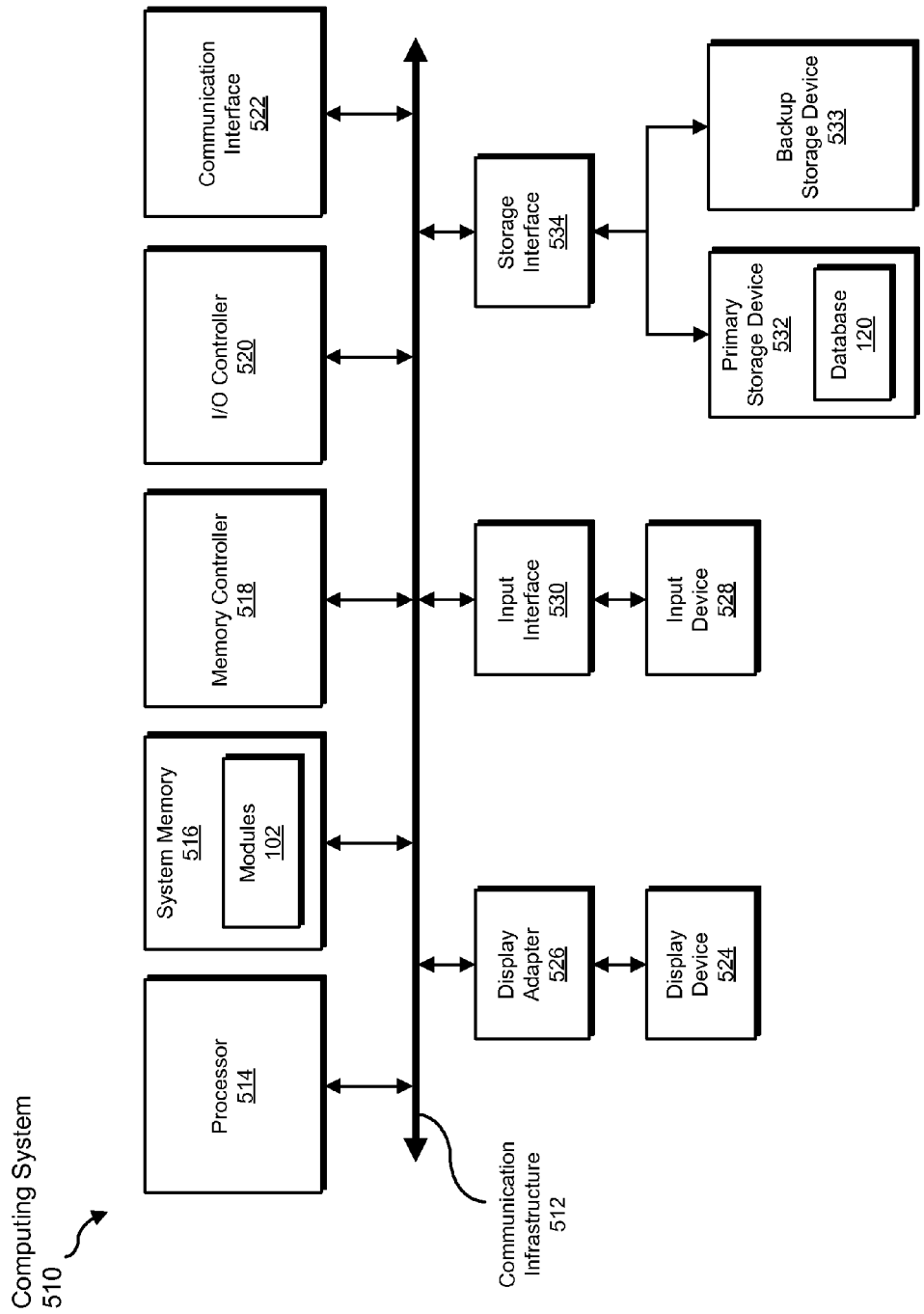
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
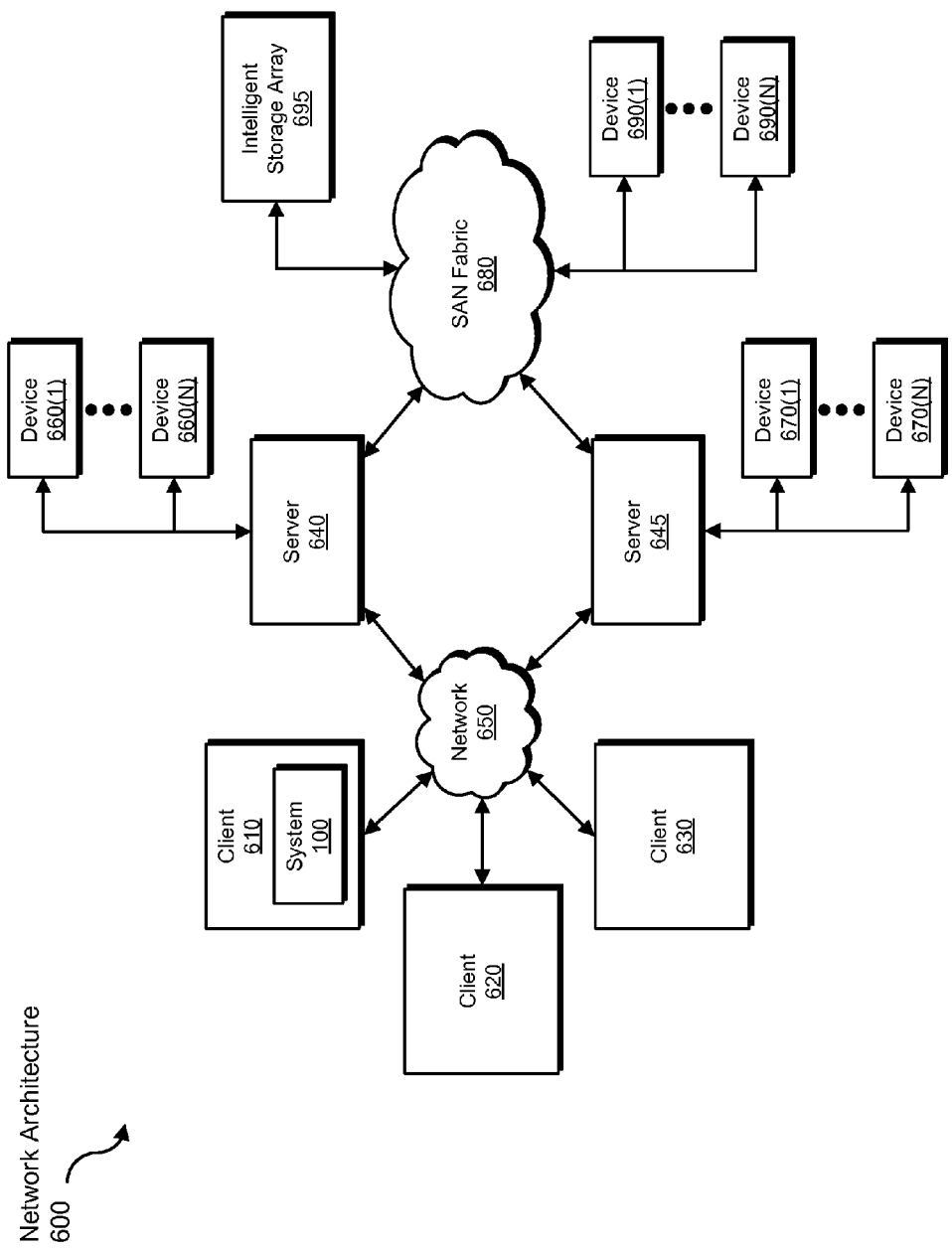
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for adaptive throttling of input/output requests in a virtual environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive latency data to be transformed, transform the latency data into a throttling determination by comparing the latency data to a threshold, and use the result of the transformation to throttle input/output operations of an application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for adaptive throttling of input/output requests in a virtual environment, at least a portion of the method being performed by a computing device comprising at least one processor, the method comprising:
    monitoring input/output requests sent from a virtual machine to a storage system;
    determining a latency of completing one or more of the monitored input/output requests by measuring an amount of time spent by the virtual machine while completing the monitored input/output request;
    determining that the latency of completing the monitored input/output request exceeds a threshold that specifies an additional amount of time such that the amount of time of the latency is greater than the additional amount of time specified by the threshold;
    reducing, in response to determining that the latency exceeds the threshold, a rate at which an application on the virtual machine sends input/output requests to the storage system.

2. The computer-implemented method of claim 1, wherein the application comprises an anti-malware application that is performing a security scan that causes the latency of completing the monitored input/output request to exceed the threshold.

3. The computer-implemented method of claim 2, wherein reducing the rate at which the application on the virtual machine sends input/output requests comprises pausing the security scan.

4. The computer-implemented method of claim 3, further comprising performing the following steps after pausing the security scan:
    monitoring additional input/output requests sent from the virtual machine to the storage system;
    determining a subsequent latency of completing one or more of the additional monitored input/output requests;
    determining that the subsequent latency of completing the additional monitored input/output request has fallen below an additional threshold;
    resuming the security scan in response to determining that the subsequent latency has fallen below the additional threshold.

5. The computer-implemented method of claim 1, wherein determining that the latency of completing the monitored input/output request exceeds the threshold comprises determining that the latency of completing one or more read operations exceeds the threshold.

6. The computer-implemented method of claim 1, wherein the virtual machine comprises one of a plurality of virtual machines that are simultaneously accessing the storage system.

7. The computer-implemented method of claim 1, where at least one of monitoring the input/output requests, determining the latency, determining that the latency exceeds the threshold, or reducing the rate is performed by the application.

8. A system for adaptive throttling of input/output requests in a virtual environment, the system comprising:
    a monitoring module that monitors input/output requests sent from a virtual machine to a storage system;
    a latency module that determines a latency of completing one or more of the monitored input/output requests by measuring an amount of time spent by the virtual machine while completing the monitored input/output request;

a determination module that determines that the latency of completing the monitored input/output request exceeds a threshold that specifies an additional amount of time such that the amount of time of the latency is greater than the additional amount of time specified by the threshold;

a throttling module that reduces, in response to determining that the latency exceeds the threshold, a rate at which an application on the virtual machine sends input/output requests to the storage system;

at least one physical processor configured to execute the monitoring module, the latency module, the determination module, and the throttling module.

9. The system of claim 8, wherein the application comprises an anti-malware application that is performing a security scan that causes the latency of completing the monitored input/output request to exceed the threshold.

10. The system of claim 9, wherein the throttling module reduces the rate at which the application on the virtual machine sends input/output requests by pausing the security scan.

11. The system of claim 10, wherein, after pausing the security scan:
the monitoring module monitors additional input/output requests sent from the virtual machine to the storage system;
the latency module determines a subsequent latency of completing one or more of the additional monitored input/output requests;
the determination module determines that the subsequent latency of completing the additional monitored input/output request has fallen below an additional threshold;
the throttling module resumes the security scan in response to determining that the subsequent latency has fallen below the additional threshold.

12. The system of claim 8, wherein the determination module determines that the latency of completing the monitored input/output request exceeds the threshold by determining that the latency of completing one or more read operations exceeds the threshold.

13. The system of claim 8, wherein the virtual machine comprises one of a plurality of virtual machines that are simultaneously accessing the storage system.

14. The system of claim 8, where at least one of the monitoring module, the latency module, the determination module, and the throttling module are part of the application.

15. A non-transitory computer-readable-storage medium comprising one or more computer-readable instructions that, when executed by at least one processor of a computing device, cause the computing device to:

monitor input/output requests sent from a virtual machine to a storage system;

determine a latency of completing one or more of the monitored input/output requests by measuring an amount of time spent by the virtual machine while completing the monitored input/output request;

determine that the latency of completing the monitored input/output request exceeds a threshold that specifies an additional amount of time such that the amount of time of the latency is greater than the additional amount of time specified by the threshold;

reduce, in response to determining that the latency exceeds the threshold, a rate at which an application on the virtual machine sends input/output requests to the storage system.

16. The non-transitory computer-readable-storage medium of claim 15, wherein the application comprises an anti-malware application that is performing a security scan that causes the latency of completing the monitored input/output request to exceed the threshold.

17. The non-transitory computer-readable-storage medium of claim 16, wherein the one or more computer-readable instructions cause the computing device to reduce the rate at which the application on the virtual machine sends input/output requests by pausing the security scan.

18. The non-transitory computer-readable-storage medium of claim 17, wherein the one or more computer-readable instructions cause the computing device to perform the following steps after pausing the security scan:
monitor additional input/output requests sent from the virtual machine to the storage system;
determine a subsequent latency of completing one or more of the additional monitored input/output requests;
determine that the subsequent latency of completing the additional monitored input/output request has fallen below an additional threshold;
resume the security scan in response to determining that the subsequent latency has fallen below the additional threshold.

19. The non-transitory computer-readable-storage medium of claim 15, wherein the one or more computer-readable instructions cause the computing device to determine that the latency of completing the monitored input/output request exceeds the threshold by determining that the latency of completing one or more read operations exceeds the threshold.

20. The non-transitory computer-readable-storage medium of claim 15, wherein the virtual machine comprises one of a plurality of virtual machines that are simultaneously accessing the storage system.

* * * * *